United States Patent Office 3,032,446
Patented May 1, 1962

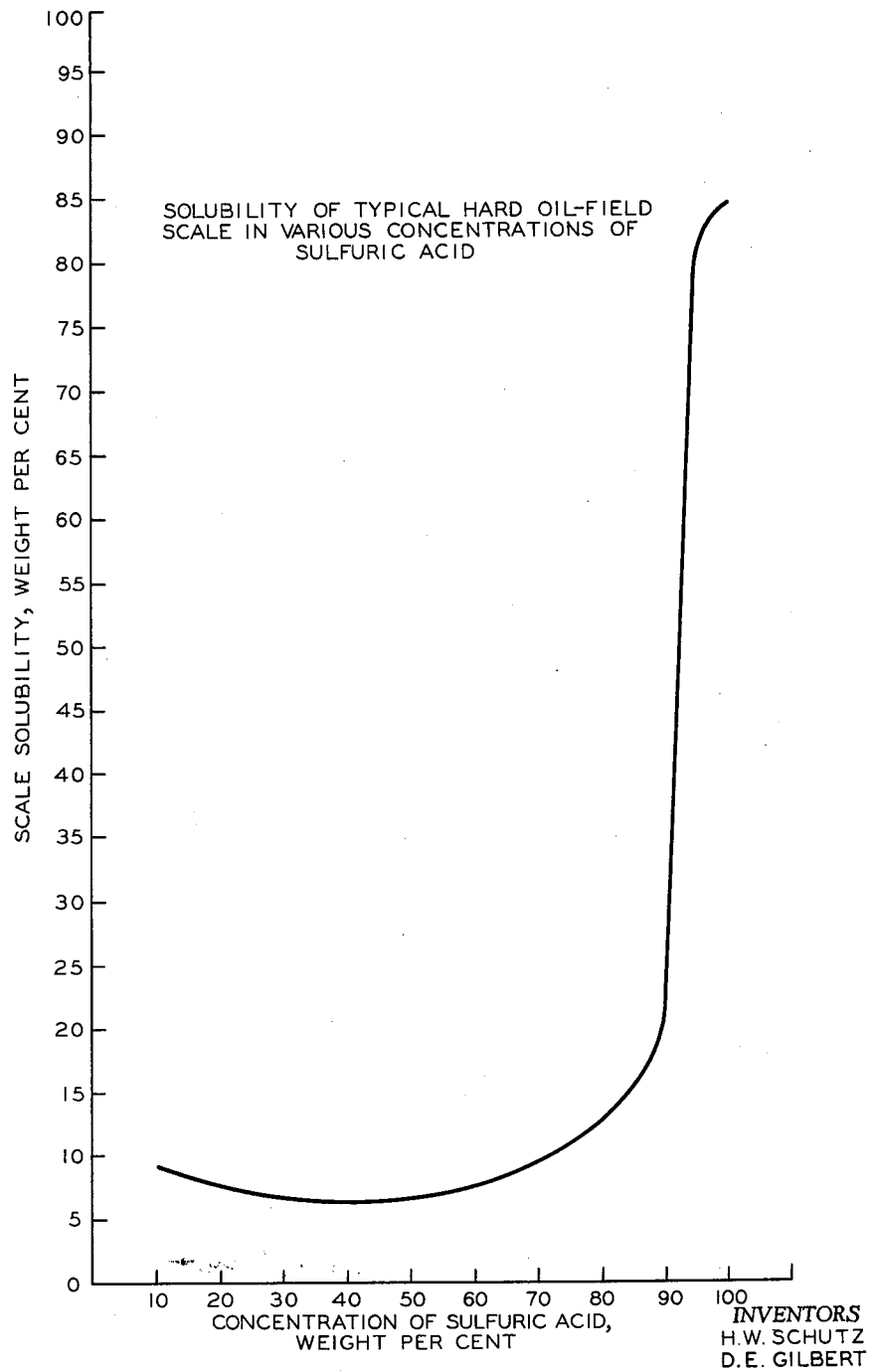

3,032,446
REMOVAL OF SCALE FROM OIL FIELD
EQUIPMENT AND THE LIKE
Howard W. Schutz and Dixie Edwina Gilbert, Bartlesville, Okla., assignors to Phillips Petroleum Company, a corporation of Delaware
Filed Apr. 17, 1958, Ser. No. 729,125
2 Claims. (Cl. 134—41)

This invention relates to the removal of scale from oil field equipment and the like. In one aspect it relates to a method for removing scale, for example a composite scale comprising barium, strontium and calcium sulfates, from metallic surfaces and the like, such as that which normally accumulates or deposits on oil field equipment, particularly oil well pumps.

Scale accumulation or deposits in oil field equipment has long been a source of trouble and operating expense. The problems of equipment cleaning and replacement have caused no little irritation to operating personnel. Despite many attempts over the course of years to overcome this problem, a satisfactory solution or answer has long eluded those skilled in the art. In many cases, equipment affected by these scale deposits has been discarded rather than attempting to remove the deposits. These scale deposits (often termed "gyp" in the field) are generally very hard and difficult to remove from metallic surfaces and the like, particularly subsurface oil field equipment, such as pumps, etc. Heretofore these scale deposits have been removed by the use of scrapers, boring tools, and other mechanical means. In some cases these deposits have been removed by hammering the coated equipment. While these mechanical methods have resulted in the removal of some deposits, it is obvious that many of these methods are highly impractical, especially where the scale deposits are located in relatively inaccessible regions of the equipment. In many cases the removal of the scale is incomplete. The practice of many of these drastic mechanical removal methods often results in damage and even total destruction of the affected equipment. At best, these mechanical removal methods are tedious, time-consuming, and give only partial results; therefore, these methods are usually not resorted to until the efficiency of the equipment has been reduced to an absolute minimum.

These scale deposits have been generally regarded as being acid-insoluble and attempts to dissolve these deposits with common solvents, such as hydrochloric acid, have proven unsatisfactory. Attempts to solve the problem by preventing its occurrence have also proven unsatisfactory for one reason or another. For example, several expensive compounds have been offered for sale as preventatives but these usually contain much undesirable inert ingredients and their use constitutes at best only partial alleviation of the problem. Moreover, these preventive remedies are limited in application to only certain types of oil field equipment that can be readily treated.

Accordingly an object of this invention is to remove scale from oil field equipment and the like. Another object is to provide an improved method for removal of scale, particularly composite scale comprising barium, strontium and calcium sulfates, from metallic surfaces and the like, particularly oil field water handling equipment such as pumps, conduits, valves, etc. Another object is to provide a method for removal of oil field scale, which method is efficient, reliable, and relatively inexpensive. Other objects and advantages of this invention will become apparent to those skilled in the art from the following discussion, accompanying drawing, and appended claims.

We have discovered that inorganic scale deposits or accumulations can be readily removed from metallic surfaces and the like, particularly oil field water handling equipment, such as well pumps, etc., by contacting or otherwise treating the scale coated equipment with sulfuric acid having a concentration greater than about 90 weight percent, preferably 90–100 weight percent sulfuric acid. A commercially available sulfuric acid which can be employed in the practice of this invention is 66 degree Baumé sulfuric acid. This invention is particularly applicable in removing composite scale deposits comprising barium, strontium and calcium sulfates, especially where such deposits accumulate in interior regions of oil field equipment, that is, regions which are generally inaccessible to ordinary mechanical methods of removal. Since the sulfuric acid is highly concentrated, its attack on metallic surfaces is relatively insignificant and can be generally disregarded.

While it is not certain how these deposits form and accumulate, it is believed that they result from the mingling of two dissimilar oil field waters or brines having incompatible compounds in solution. For example, it is thought that the composite scale deposits, comprising barium, strontium and calcium sulfate, are formed by the mingling of an oil field water or brine containing soluble salts of these alkaline earth metals with an oil field water or brine containing a soluble sulfate, these soluble compounds uniting to form a hard, insoluble, composite scale which accumulates and deposits on metal equipment surfaces by reason of supersaturation, settling, and temperature and/or pressure changes.

Although we propose to remove these scale deposits primarily from oil field equipment, it is obvious that this invention can be employed wherever the problem arises. Furthermore, although we intend by the practice of this invention to remove these scale deposits primarily from metallic surfaces, such as steel, cast iron, bronze, copper-bearing metals, alloys, etc., the invention is not necessarily limited thereto but can be used to remove scale deposits from any substrate that is not appreciably attacked or otherwise deteriorated by the sulfuric acid contacting and removal agent.

In general, the contacting or treating step can be accomplished by simple washing, flushing, immersion, refluxing, recycling, etc., and the preferred operating procedure to be employed will be evident to those skilled in the art upon being acquainted with this invention. In the case of oil well production pumps, the contacting step can be accomplished after disassembling the pump, or by operating the pump while the latter is submerged in the sulfuric acid. If there is present in the equipment any substantial amount of water, it is preferred to dry the equipment prior to the contacting step. Although the contacting step can be carried out with agitation, it is not essential but is preferably employed to hasten the removal of the deposits from the surfaces of equipment so treated. The equipment to be treated can be first disassembled if desired and it is evident that special tanks provided with suitable agitation, equipment suspending, and heating means can be employed if desired.

The contacting or treating temperature employed in the practice of this invention can vary over a wide range of temperatures; however, satisfactory removal of the deposits can be effected at room temperature, or at elevated temperatures (i.e., 140–160° F.) to insure more rapid removal. The sulfuric acid can be preheated prior to the contacting step or the sulfuric acid can be applied to the scale coated surface and then either the equipment and/or the sulfuric acid itself can be heated.

The contacting step is generally carried out at atmospheric pressure although pressures other than atmospheric can be employed if desired. The time required for the removal of the deposits is dependent upon various considerations, such as the extent and thickness of the scale, and can vary from a few minutes to several hours. Generally for maximum removal of deposits, the contacting step is carried out for a period of time sufficient to dissolve the deposits and short of the time when the sulfuric acid becomes saturated, although the preferred contact time is at least one hour for most types of equipment. In most cases the sulfuric acid can be reused. In practicing this invention it has been found that the period of time necessary for efficient removal of the scale deposits has been reduced to a fraction of the time generally required heretofore. In some cases the period of the contacting step will be controlled so as to prevent appreciable attack of the equipment by the acid, although generally speaking the metallic surfaces will remain unaffected by the acid.

In the practice of this invention, we have found that it is particularly applicable in the case of hard composite scales comprising barium, strontium and calcium sulfates as well as iron oxide. The deposits can also comprise magnesium sulfate as well as inerts, such as silicon dioxide, clay, etc., and traces of other elements. Composite scale deposits comprising barium, strontium and calcium sulfate and iron oxide are generally present in subsurface water in Oklahoma, Texas and Kansas, as well as other parts of the country. It is evident that the particular nature and relative proportions of compounds present in the scale deposits will depend upon the particular oil field waters or brines found in various parts of the country.

A typical hard oil field scale, obtained from metallic surfaces of a subsurface oil well pump, upon analysis was found to have the composition set forth in Table I.

TABLE I

*Composition of Typical Hard Oil Field Scale*

| Scale component: | Weight percent |
| --- | --- |
| $BaSO_4$ | 74.9–77 |
| $SrSO_4$ | 11.1–10.1 |
| $CaSO_4 \cdot 2H_2O$ | 3.7–3.4 |
| $Fe_2O_3$ | 10.3–9.3 |
| Others [1] | |

[1] Traces of Si, Al, Cu, Mg, Pb, Mn.

The advantages of the instant invention are further illustrated by the following example:

Samples of the scale deposits set forth in Table I were weighed and each sample was contacted with a sulfuric acid solvent having a different concentration. In each case, the scale sample was added to the acid in the ratio of 5 grams of scale to 100 milliliters (183.3 grams) of 100 weight percent acid, so that each concentration of acid had the same quantity of 100 weight percent acid in relation to the quantity of scale sample. The scale-acid samples were heated on an oscillating hot plate maintained at 150±5° F. for a period of four hours. Following this period, the sulfuric acid solutions were separated from the remaining scale residues. In runs 1–4, this separation was carried out by first centrifuging the scale-acid samples at about 10,000 r.p.m. and then decanting the acid solution. In runs 5 and 6, the separation was accomplished by filtering the scale-acid samples. The residues from each of the samples were dried and weighed.

The weight percent solubility of the scale samples in the various concentrations of acid were then calculated and these values are plotted on the graph of the attached drawing. The results of this investigation are set forth in Table II.

TABLE II

*Solubility of Typical Hard Oil-Field Scale in Various Concentrations of Sulfuric Acid*

| Run | Wt. Scale (gm.) | Acid Conc. (wt. percent) | Wt. 100% acid (gm.) | Wt. Residue (gm.) | Solubility (wt. percent) |
| --- | --- | --- | --- | --- | --- |
| 1 | 0.500 | 100 | 18.83 | 0.0784 | 84.3 |
| 2 | 0.477 | 95.5 | 17.49 | 0.0885 | 81.5 |
| 3 | 0.430 | 90 | 15.76 | 0.3264 | 24.1 |
| 4 | 0.382 | 80 | 14.00 | 0.3335 | 12.7 |
| 5 | 2.500 | 50 | 91.80 | 2.332 | 6.71 |
| 6 | 0.500 | 10 | 18.83 | 0.454 | 9.14 |

From the results set forth in Table II and the accompanying drawing, it is seen that the solubility of the scale surprisingly and remarkably increases when the concentration of the sulfuric acid is greater than about 90 weight percent, and best results are obtained with about 90 to 100 weight percent sulfuric acid.

Various modifications and alterations of this invention will become apparent to those skilled in the art without departing from the scope and spirit of this invention, and it is to be understood that the foregoing discussion and examples represent preferred and illustrative embodiments of this invention and do not unduly limit the same.

We claim:

1. An improved method of removing inorganic oil field scale from metallic surfaces of oil field production equipment, said scale comprising barium, strontium, and calcium sulfates, which comprises contacting the metallic surfaces of oil field production equipment containing said scale with sulfuric acid having a concentration in the range between about 90 and 100 weight percent for a period of time sufficient to substantially dissolve said scale from said equipment.

2. An improved method for the removal of inorganic oil field scale from metallic surfaces of water handling equipment, said scale comprising the sulfates of barium, strontium, and calcium, and iron oxide, which comprises contacting the metallic surfaces of oil field water handling equipment containing said scale with sulfuric acid having a concentration in the range between about 90 and 100 weight percent for a period of time sufficient to substantially dissolve said scale from said equipment.

References Cited in the file of this patent

UNITED STATES PATENTS

| 1,146,071 | Hoffman | July 13, 1915 |
| 2,849,340 | Sutton et al. | Aug. 26, 1958 |

OTHER REFERENCES

Journal American Chemical Society, 1921, vol. 43; pages 979, 981–983, 987–990 relied on.

"Inorganic Chemistry," Fritz Ephraim, 6th English edition, revised 1954 (page 606 relied on).